United States Patent
Sharma et al.

(10) Patent No.: US 8,234,250 B1
(45) Date of Patent: Jul. 31, 2012

(54) PROCESSING DATA OF A FILE USING MULTIPLE THREADS DURING A DEDUPLICATION GATHERING PHASE

(75) Inventors: Alok Sharma, Karnataka (IN); Praveen Killamsetti, Karnataka (IN); Bipul Raj, Karnataka (IN)

(73) Assignee: NetApp. Inc., Sunnyvale, CA (US)

( * ) Notice: Subject to any disclaimer, the term of this patent is extended or adjusted under 35 U.S.C. 154(b) by 475 days.

(21) Appl. No.: 12/561,683

(22) Filed: Sep. 17, 2009

(51) Int. Cl.
*G06F 17/30* (2006.01)

(52) U.S. Cl. ............ 707/649; 707/650; 707/653; 712/22

(58) Field of Classification Search .................. 707/647, 707/648, 649, 650, 653; 712/22
See application file for complete search history.

(56) References Cited

U.S. PATENT DOCUMENTS

| | | | |
|---|---|---|---|
| 7,921,328 B1 * | 4/2011 | Gulati et al. ..................... | 714/15 |
| 2005/0138195 A1 * | 6/2005 | Bono ............................ | 709/231 |
| 2007/0186032 A1 * | 8/2007 | Sinclair et al. ................. | 711/103 |
| 2008/0077607 A1 * | 3/2008 | Gatawood et al. ............. | 707/101 |
| 2010/0262777 A1 * | 10/2010 | Kaga et al. ..................... | 711/118 |

\* cited by examiner

*Primary Examiner* — Jean B Fleurantin
*Assistant Examiner* — Dennis Myint
(74) *Attorney, Agent, or Firm* — Stattler-Suh PC

(57) ABSTRACT

A method and apparatus for deduplication of files of a storage system is described. During a gathering phase, a file may be simultaneously processed by two or more threads to produce and store content identifiers for data blocks of the file. Each file may be sub-divided into multiple file sub-portions, each file sub-portion comprising a predetermined number of data blocks. A thread may be assigned to each sub-portion of a file for processing the data blocks. The currently assigned sub-portion for each thread may be recorded and used upon a system crash to restart each scanner thread at the currently assigned sub-portion to minimize the data blocks that are re-processed. The size of a file sub-portion may be predetermined based on the organization of inode data structures representing the files (e.g., based on the maximum number of pointers that an indirect block in the inode data structure may contain).

20 Claims, 9 Drawing Sheets

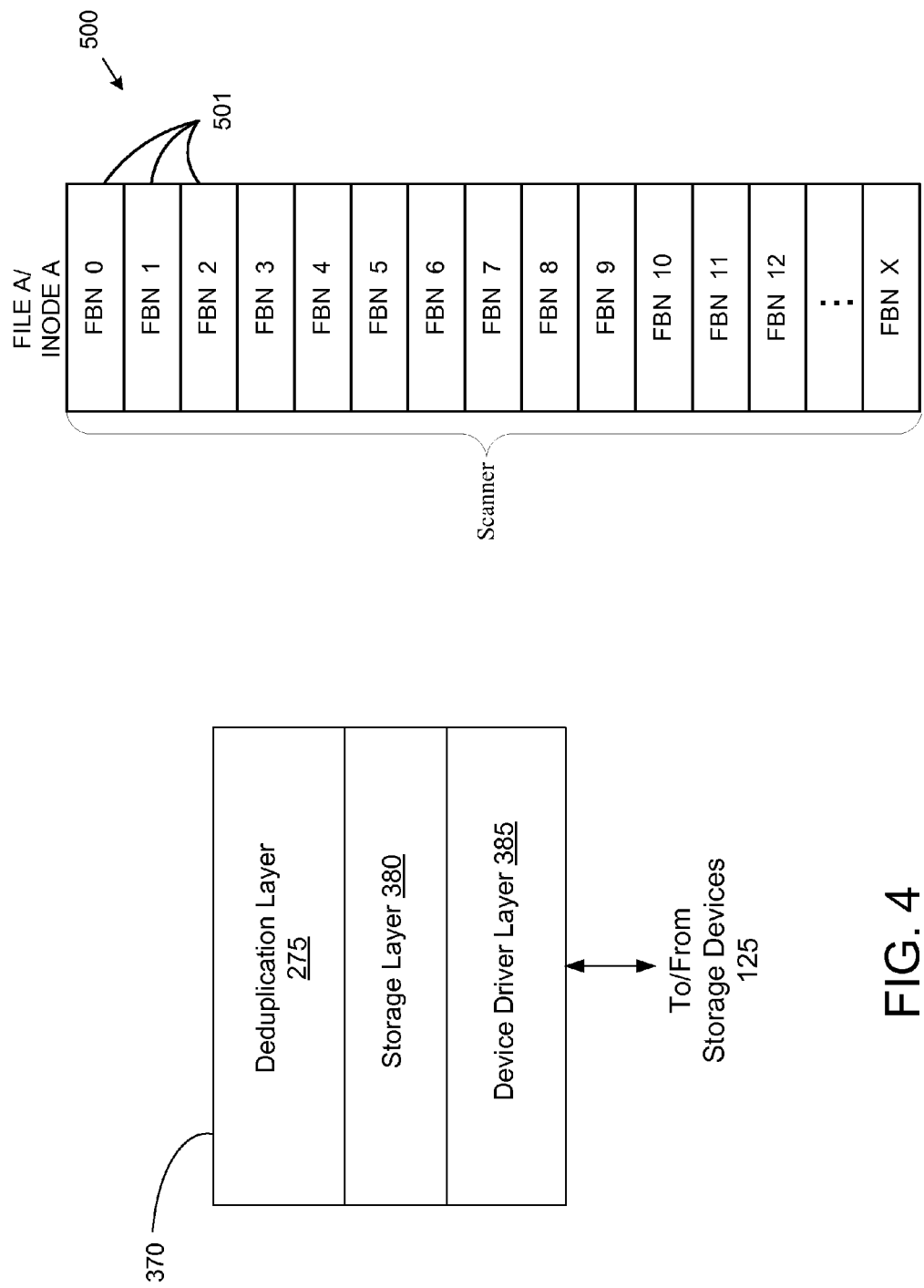

| Entry Type | INODE # | FBN | Scanners |
|---|---|---|---|
| Global | Z | K | 6 |
| Scanner 1 | X | B to C | |
| Scanner 2 | X | D to F | |
| Scanner 3 | Y | 0 to G | |
| Scanner 4 | Z | 0 to H | |
| Scanner 5 | Z | J to K | |
| ... | ... | ... | |

FIG. 7

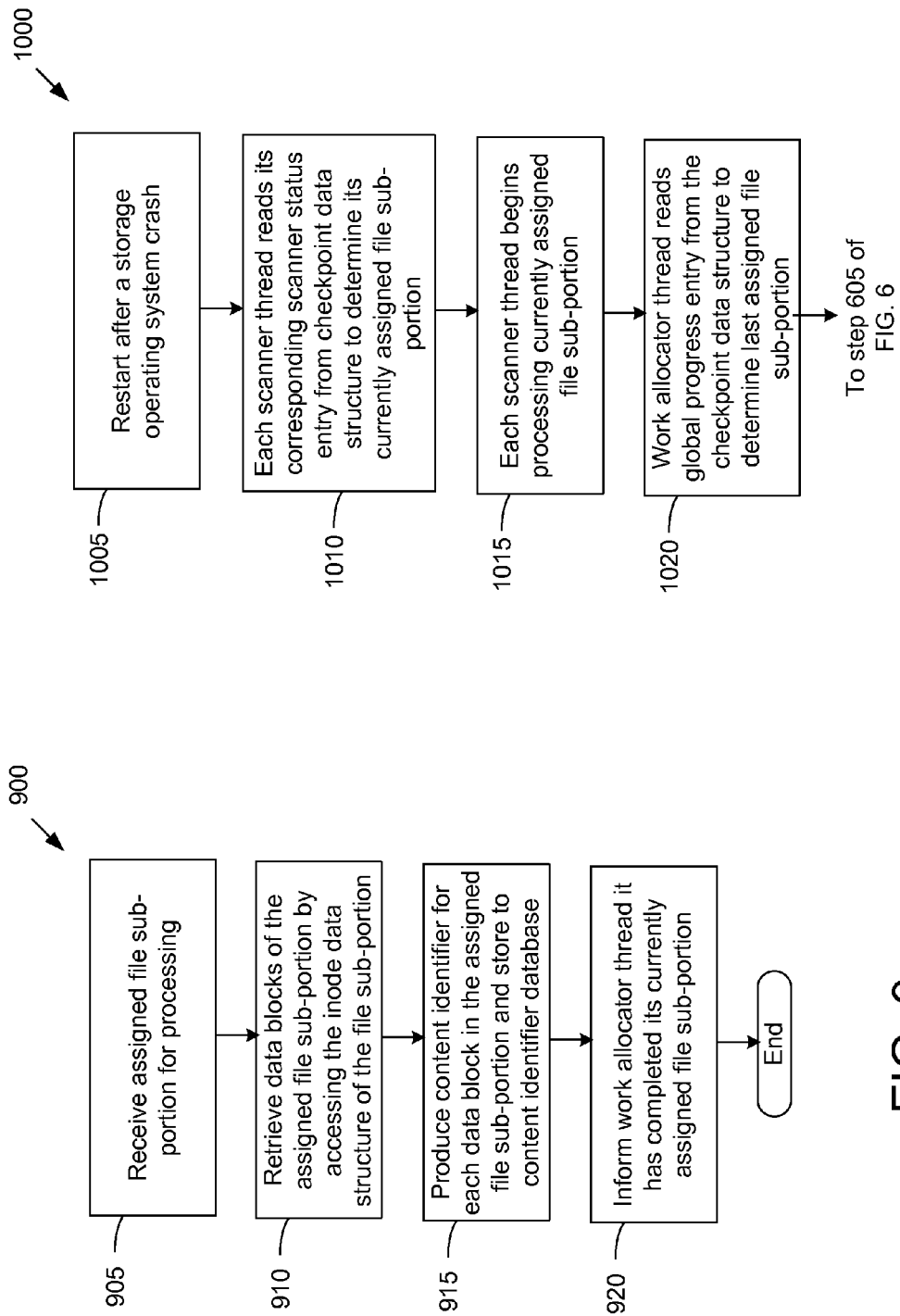

PROCESSING DATA OF A FILE USING MULTIPLE THREADS DURING A DEDUPLICATION GATHERING PHASE

FIELD OF THE INVENTION

The present invention relates to storage systems, and particularly, to processing data of a file using multiple threads during a deduplication gathering phase.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may implement deduplication methods when storing data on the storage devices. Deduplication methods may be used to remove redundant data and to ensure that only a single instance of the same data is stored on the storage devices. Rather than storing multiple copies of the same data on the storage devices, a single instance of the data is typically stored and referenced/indexed multiple times. Since redundant data is removed, deduplication of data typically saves storage space. Deduplication of data, however, may cause longer read latencies when reading data that has been deduplicated. In some embodiments, when a file to be written to the storage devices is received, any blocks of the received file that match any blocks currently stored in the storage devices are typically considered redundant blocks and are deduplicated (i.e., are deleted from or not stored to the storage devices and a reference/index to the address location of the matching stored blocks is produced in their place). Any non-redundant blocks in the received file are written to the storage devices. When a read request for the received file is later received, the storage system performs the read request by retrieving the stored non-redundant blocks and, for each redundant block, uses the reference/index produced for the redundant block to seek and retrieve its matching stored block.

Deduplication may be performed by producing a content identifier value of each block that represents the data contents of the block. For example, the content identifier value of a block may be determined using a fingerprint, checksum, or hash operations (such as Message Digest 5, SHA, etc.) that produces a fingerprint, checksum, or hash value (content identifier value) representing the data contents of the block. Regardless of the particular content identifier operation used to produce the content identifier value, typically the content identifier operation is configured such that when two blocks have the same content identifier value, there is a high probability that the two blocks have the same data content as well, and thus one block may be deduplicated. Typically, the content identifier of each block may be produced and stored to a content identifier database during a "gathering" phase. For example, during the gathering phase, each block of each file in a file system may be processed to populate the content identifier database. The content identifier database may then be used to identify redundant blocks and deduplicate blocks as necessary.

Typically, deduplication is performed in a single-threaded manner, whereby each file in a file system is processed by a single scanner thread that produces and stores a content identifier for each block in the file, which may not fully utilize storage system resources and take longer than necessary. Also, for each scanner thread processing a file, a file checkpoint may be recorded periodically in case of a storage system "crash." Upon restart/reboot of the storage system, however, each scanner thread may typically restart processing of the entire file that was recorded at the last file checkpoint, which may unnecessarily consume storage system resources. As such, there is a need for a more efficient method of processing data files in the deduplication gathering phase.

SUMMARY OF THE INVENTION

A method and apparatus for a deduplication gathering phase for files of a storage system using multi-threading is described herein. In some embodiments, during a gathering phase of deduplication, each file is simultaneously processed by two or more scanner threads to produce and store content identifiers for blocks of the file. Each file may be sub-divided into a plurality of file sub-portions, each file sub-portion comprising a sub-set of the file and having a predetermined number of data blocks of the file. A scanner thread may be assigned to each sub-portion of a file for processing blocks of the sub-portion. In some embodiments, a checkpoint data structure is produced and maintained to record progress of the scanner threads at a sub-file level. In these embodiments, after a scanner thread is assigned a new file sub-portion, the checkpoint data structure is updated to reflect the current sub-portion assignment (e.g., by specifying the file and the first and last file block numbers of the currently assigned sub-portion). Upon a crash and restart of the storage system, the checkpoint data structure may be used to restart each scanner thread at the currently assigned sub-portion.

By sub-dividing each file into sub-portions of predetermined block size and assigning a separate scanner thread to process each sub-portion, a relatively equal and fixed-sized amount of work may be assigned to each scanner thread. This may maximize use of the scanner threads by reducing the idle time of the scanner threads that may be incurred when workloads of significantly differing size are assigned to the scanner threads (as is conventionally incurred when files of widely varying size are assigned to scanner threads). By assigning relatively equally sized amounts of work to each scanner thread, the occurrence of one thread being assigned too little or too much work relative to other threads may be reduced, thus maximizing use of the scanner threads overall. Further, this helps ensure that each scanner thread has assigned work, even if the number of files in the file system is less than the number of scanner threads (which may be common when a volume, such as a logical unit, has a few large-sized files). Also, by processing each file using two or more scanner threads simultaneously, each file may be processed more rapidly.

By recording progress of the scanner threads at a sub-file level, the amount of processing work that needs to be redone after a crash and restart of the storage system may be reduced. In these embodiments, the checkpoint data structure may store status data for each scanner thread specifying the sub-portion currently assigned to the scanner thread. For example, the status data of a scanner thread may specify the file and the first and last file block number of the currently assigned sub-portion. As such, the status data of the scanner threads may indicate the file sub-portions that have been allocated for processing but not yet completed. By updating the status data of each scanner thread after each assigned sub-portion is completed, upon a crash and restart of the storage system, for each scanner thread, the number of blocks to be re-processed is minimized to the number of blocks in the currently assigned sub-portion (that was being processed just before the crash but not yet completed) rather than the entire file which may require significant amounts of re-processing for large files. In these embodiments, multiple scanner threads may be restarted within the same file to re-process different sub-portions of the file.

In some embodiments, the data block size of a file sub-portion is predetermined based on the file system arrangement/organization of inode data structures representing the files. As known in the art, a file system implemented on the storage system may use inode data structures (buffer trees) to represent the files in the file system. An inode data structure for a file may comprise a root level inode (containing file metadata and pointers to data blocks or indirect blocks), zero or more indirect blocks (containing pointers to data blocks or other indirect blocks), and one or more data blocks (containing the actual data of the file). Typically, the file system will arrange/organize the inode data structure for each file in a predetermined manner (depending on the type of file system). For example, the file system may arrange the inode data structures by allowing each indirect block to contain a predetermined maximum number of pointers (e.g., 510) to data blocks or other indirect blocks.

As discussed above, a file sub-portion comprises a predetermined number of data blocks of a file. In these embodiments, the number of data blocks (data block size) of a file sub-portion may be predetermined based on the organization of the inode data structures representing the files. In some embodiments, the data block size of a file sub-portion is based on the maximum number of pointers (to data blocks or indirect blocks) that an indirect block in the inode data structure may contain. For example, if each indirect block may contain a maximum of 510 pointers, the data block size of a file sub-portion may be based on the number 510, so that it may be fixed and predetermined at 510 data blocks, 510*510 data blocks, etc. By basing the file sub-portion size on the maximum number of pointers in an indirect block, the size of the file sub-portion may be aligned with the organization of the inode data structures to allow faster performance in processing the file sub-portions by the scanner threads. This is because, when locating and retrieving data blocks of an assigned file sub-portion in the corresponding inode data structure, a scanner thread may retrieve and examine pointers from a fewer number of indirect blocks in the inode data structure, which provides faster data block lookups for each scanner thread.

BRIEF DESCRIPTION OF THE DRAWINGS

The novel features are set forth in the appended claims. However, for purpose of explanation, several embodiments of the invention are set forth in the following figures.

FIG. 4 is a conceptual diagram of storage-side layers of the storage operating system;

FIG. 5 show a conceptual diagram of an exemplary file comprising a plurality of data blocks;

FIG. 7 shows a conceptual diagram of an exemplary checkpoint data structure;

FIG. 9 is a flowchart of a method for processing a file sub-portion during a deduplication gathering phase;

FIG. 10 is a flowchart of a method for restarting the gathering phase after a system crash and restart.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a storage system environment in which some embodiments operate. Section II describes processing data of a file using multiple threads during a deduplication gathering phase. Section III describes inode data structures that represent files and processing data of files based on the organization of the inode data structures during a deduplication gathering phase.

I. Storage System Environment

Figure 1:
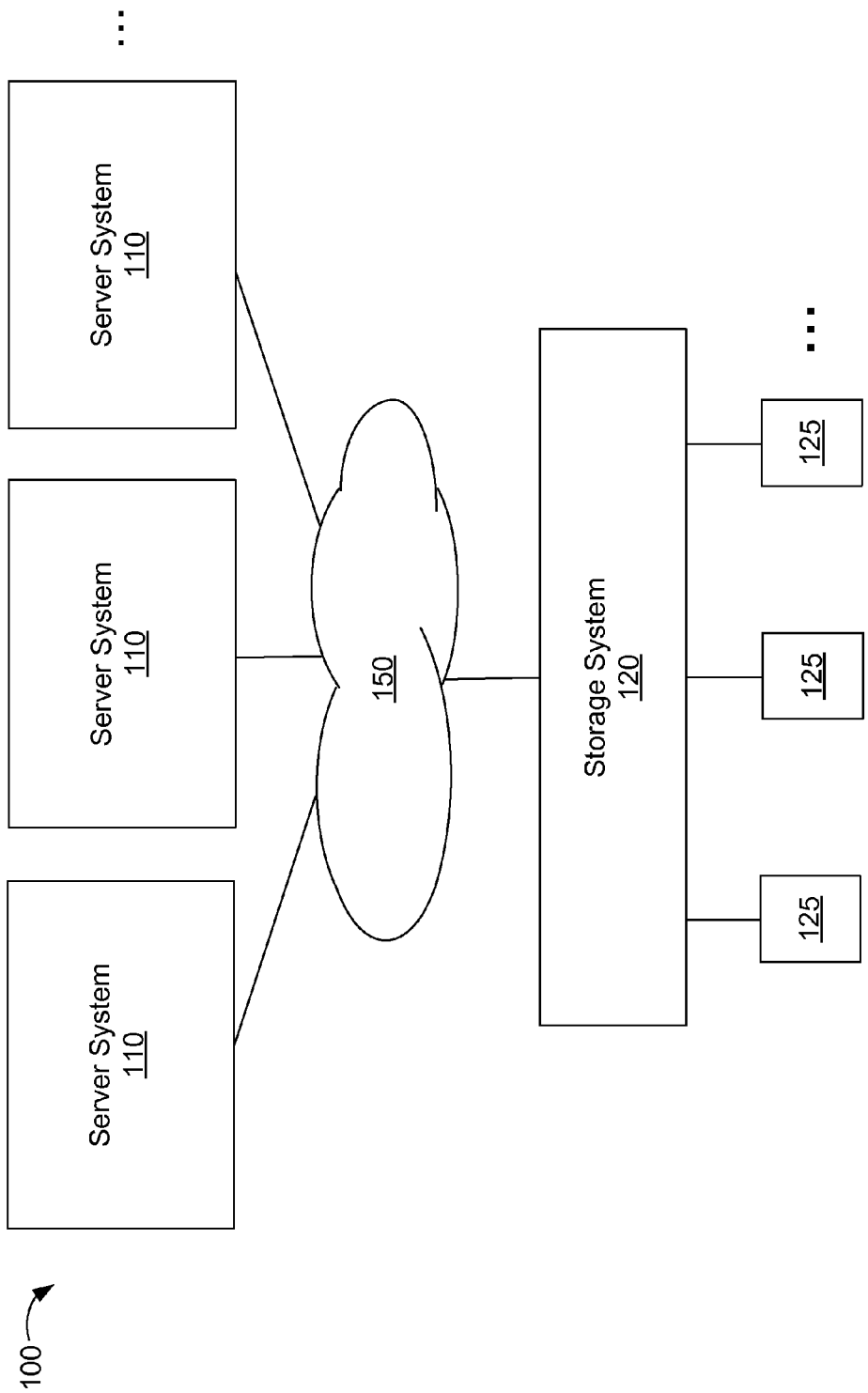
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices 125 of the storage system 120. A server system 110 may execute one or more applications that submit read/write requests for reading/writing data on the storage devices 125 of the storage system 120. Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In other embodiments, the storage device 125 may comprise any other type of storage device.

The storage system 120 may implement a file system to logically organize the data as a hierarchical structure of directories and files on each storage device 125. Each file may be implemented as a set of data blocks configured to store data, whereas each directory may be implemented as a specially-formatted file in which information about other files and directories are stored. A data block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.). In some embodiments, the file system may use inode data structures (sometimes referred to as buffer trees) to represent the files in the file system. In these embodiments, the number of data blocks (data block size) of a file sub-portion is predetermined based on the file system arrangement/organization of the inode data structures (described further below in Section III). Deduplication of data of a file is described in some embodiments below. However, in other embodiments, another other data container other than a file may be used.

Figure 2:
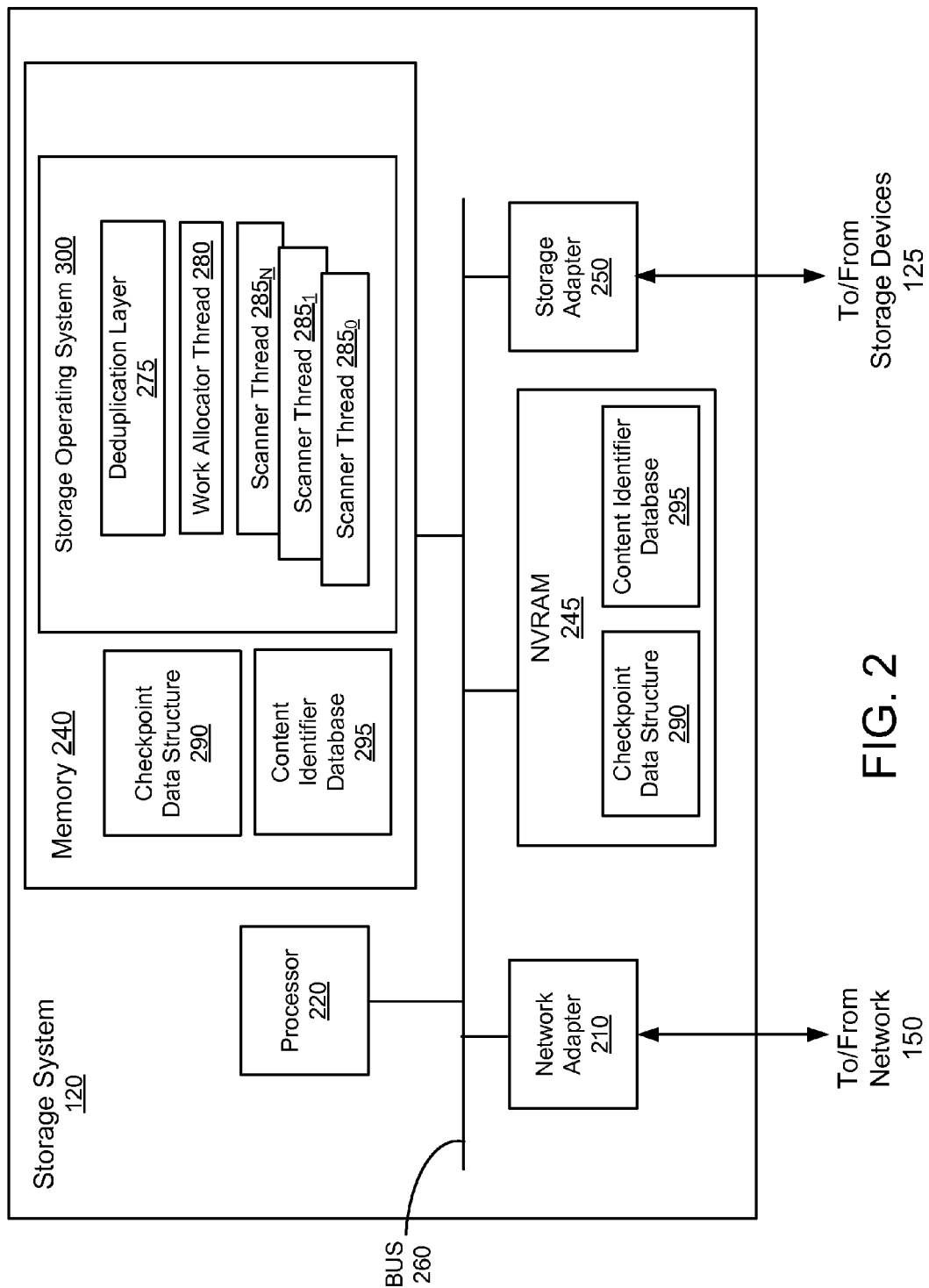
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication engine/layer 275) that are executed by the processor 220. In some embodiments, the deduplication engine/layer 275 is implemented to process data of a file using multiple threads during the gathering phase of deduplication.

The storage operating system 300 may produce a work allocator engine/thread 280 and multiple scanner engine/threads 285, the engine/threads being configured to execute on the storage system and work in conjunction with the deduplication engine/layer 275 to perform embodiments described herein. In some embodiments, the storage operating system 300 may produce a predetermined number of scanner threads (e.g., 5 scanner threads). In other embodiments, the storage operating system may also dynamically allocate and produce new scanner threads. In general, a thread may comprise a predetermined process defined by the storage operating system 300 and executed by a processor.

In some embodiments, any software module, software layer, or thread described herein may comprise an engine comprising firmware or software and hardware configured to perform embodiments described herein. For example, the storage operating system may comprise a storage operating system engine comprising firmware or software and hardware configured to perform embodiments described herein. As a further example, the deduplication layer may comprise a deduplication engine comprising firmware or software and hardware configured to perform embodiments described herein. As another example, the scanner thread may comprise a scanner engine comprising firmware or software and hardware configured to perform embodiments described herein. In general, functions of a software module or software layer described herein may be embodied directly in hardware, or embodied as software executed by a processor, or embodied as a combination of the two. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a checkpoint data structure 290 and content identifier database 295 are also resident in memory 240. In other embodiments, the checkpoint data structure 290 and content identifier database 295 may also be resident in NVRAM 245 or stored on a storage device 125 (e.g., stored on an aggregate or volume in a metadata section not accessible to users). As discussed below, in some embodiments, the checkpoint data structure 290 is produced and used by the deduplication layer 275 to record progress of the scanner threads 285 in processing data blocks of files to produce content identifiers for the blocks during the gathering phase of deduplication. The scanner threads 285 may produce and store the content identifiers for the data blocks to the content identifier database 295 during the gathering phase. The content identifier database 295 may then be used to identify redundant data blocks in the files of the file system and deduplicate data blocks as necessary.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
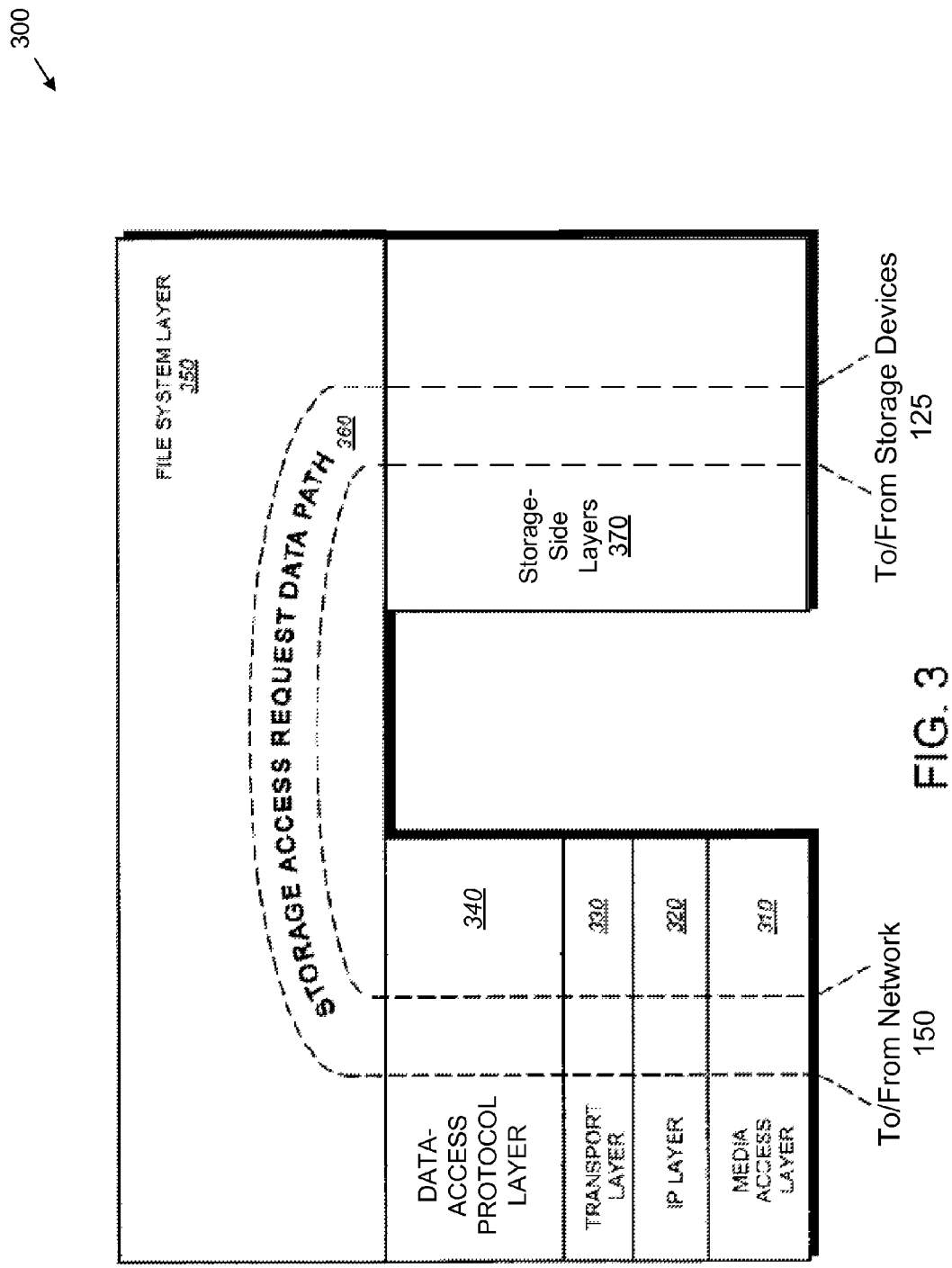
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage-side layers 370. As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300.

In an illustrative embodiment, the file system layer 350 implements a file system having an on-disk format representation that is block-based using inode data structures to describe the files. The file system layer 350 assigns, for each file, a unique file identifier (inode number) and an associated inode data structure (described below in Section III). The file system 350 may store and maintain an inode file that contains and indexes (by file identifier/inode number) the inodes of the various files. In response to receiving a file-access request (containing an external file handle) from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode data structure entry for the identified file and retrieve file location information (e.g., logical block number) from the inode data structure.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to perform embodiments described herein. For example, the deduplication layer 275 may reside between the file system layer 350 and the storage layer 380 of the storage operating system 300 (as shown in FIGS. 3 and 4). In other embodiments, the deduplication layer 275 may reside in or near other layers of the storage operating system 300 (e.g., may reside within the file system layer 350). In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein.

II. Multi-Threaded Processing of a File During Deduplication Gathering Phase

A. Deduplication Background

The storage system 120 may implement deduplication methods when storing data on the storage devices 125. Deduplication methods may be used to remove redundant data and ensure that only a single instance of the same data is stored on the storage devices. Rather than storing multiple copies of the same data on the storage devices, a single instance of the data is typically stored and referenced/indexed multiple times. Deduplication of data may be applied at any level, for example, across a single storage device 125 or volume (where redundant data within the single storage device 125 or volume are removed), across multiple storage devices 125 or volumes (where redundant data within multiple storage devices 125 or volumes are removed), across the entire storage system 120 (where redundant data within the storage system 120 are removed), across multiple storage systems 120 (where redundant data within the multiple storage systems 120 are removed), and so forth. Deduplication of a redundant block may comprise deleting from or not storing the redundant block to the storage devices and, producing in their place, an index to the address location of the corresponding matching stored blocks (the index being produced, for example, in the inode data structure for a file). Since redundant data blocks are removed, deduplication of data typically saves storage space.

Deduplication may be performed by producing a content identifier value of each block that represents the data contents of the block. For example, the content identifier value of a block may be determined using a fingerprint or checksum operation that produces a fingerprint or checksum value representing the data contents of the block. When two blocks have the same fingerprint or checksum value, there is a high probability that the two blocks have the same data content as well, and thus one block may be deduplicated. Typically, the content identifier of each block may be produced and stored to a content identifier database 295 during a "gathering" phase of deduplication. For example, during the gathering phase, each block of each file in a file system may be processed to populate the content identifier database. The content identifier database may then be used to identify redundant blocks and deduplicate blocks as necessary.

Typically, the deduplication gathering phase is performed in a single-threaded manner, whereby each file in a file system is processed by a single scanner thread that produces and stores a content identifier for each block in the file, which may not fully utilize storage system resources and take longer than necessary. Also, for each scanner thread processing a file, a file checkpoint may be recorded periodically in case of a storage system "crash." Upon restart/reboot of the storage system, however, each scanner thread may typically restart processing of the entire file that was recorded at the last file checkpoint, which may unnecessarily consume storage system resources.

FIG. 5 show a conceptual diagram of an exemplary file 500 comprising a plurality of data blocks 501 storing data of the file. The file system 350 may represent each file using an inode data structure and assign, for each file and corresponding inode data structure, a unique inode number (e.g., inode number "A" in the example of FIG. 5). The arrangement/organization of inode data structures is described further below in Section III. Each data block 501 of a file 500 may be uniquely identified within the file by a file block number (FBN). An FBN may comprise a number describing a particular block within a file. For example, the first block of the file may be numbered as FBN number 0 and each block thereafter being sequentially increased (1, 2, . . . X). A FBN does not necessarily bear a given relation to the location of data stored on physical blocks on a storage device, such as a disk, but instead refers to the actual ordering of data within a file. As such, each data block in the file system may be uniquely identified within the file system by the combination of an inode number (indicating the file and inode data structure containing the data block) and an FBN (indicating the ordering position of the data block within the file). In other embodiments, each data block may be uniquely identified within the file system by other means (e.g., logical block number, etc.). Typically, in the gathering phase of deduplication, a single scanner thread is assigned to an entire file (regardless of the file size) and processes all blocks of the entire file 501 to produce content identifiers of the blocks.

B. Multi-Threaded Processing of a File During Gathering Phase

In some embodiments, during a gathering phase of deduplication, each file is simultaneously processed by two or more scanner threads to produce and store content identifiers for blocks of the file. Each file may be sub-divided into two or more file sub-portions, each file sub-portion comprising a predetermined number of data blocks. A scanner thread may be assigned to each sub-portion of a file for processing blocks of the sub-portion. In some embodiments, a checkpoint data structure is produced and maintained to record progress of the scanner threads. In these embodiments, the check checkpoint data structure records the currently assigned file sub-portion of each scanner thread. Upon a crash and restart of the storage system, the checkpoint data structure may be used to restart each scanner thread at the currently assigned sub-portion.

By sub-dividing each file into sub-portions of predetermined block size and assigning a separate scanner thread to process each sub-portion, a relatively equal and fixed-sized amount of work may be assigned to each scanner thread. This may maximize use of the scanner threads by reducing the idle time of the scanner threads that may be incurred when workloads of significantly differing size are assigned to the scanner threads (as is conventionally incurred when files of significantly differing size are assigned to scanner threads). By assigning relatively equally sized amounts of work to each scanner thread, the occurrence of one thread being assigned too little or too much work relative to other threads may be reduced, thus maximizing use of the scanner threads. Further, this helps ensure that each scanner thread has assigned work, even if the number of files in the file system is less than the number of scanner threads (which may be common when a volume, such as a logical unit, has a few large sized files). Also, by processing each file using two or more scanner threads simultaneously, each file may be processed more rapidly.

By recording progress of the scanner threads at a sub-file level, the amount of processing work that needs to be redone after a crash and restart of the storage system may be reduced. In these embodiments, the checkpoint data structure may store status data for each scanner thread specifying the sub-portion currently assigned to the scanner thread. For example, the status data of a scanner thread may specify the file and the first and last file block number (FBN) of the currently assigned sub-portion. As such, the status data of the scanner threads may indicate the file sub-portions that have been allocated for processing but not yet completed. By updating the status data of each scanner thread after each assigned sub-portion is completed, upon a crash and restart of the storage system, for each scanner thread, the number of blocks to be re-processed is minimized to the number of blocks in the currently assigned sub-portion (that was being processed before the crash but not completed) rather than the entire file which may require significant amounts of re-processing for large files. In these embodiments, multiple scanner threads may be restarted within the same file to re-process different sub-portions of the file.

C. Method for Multi-Threaded Processing of a File

Figure 6:
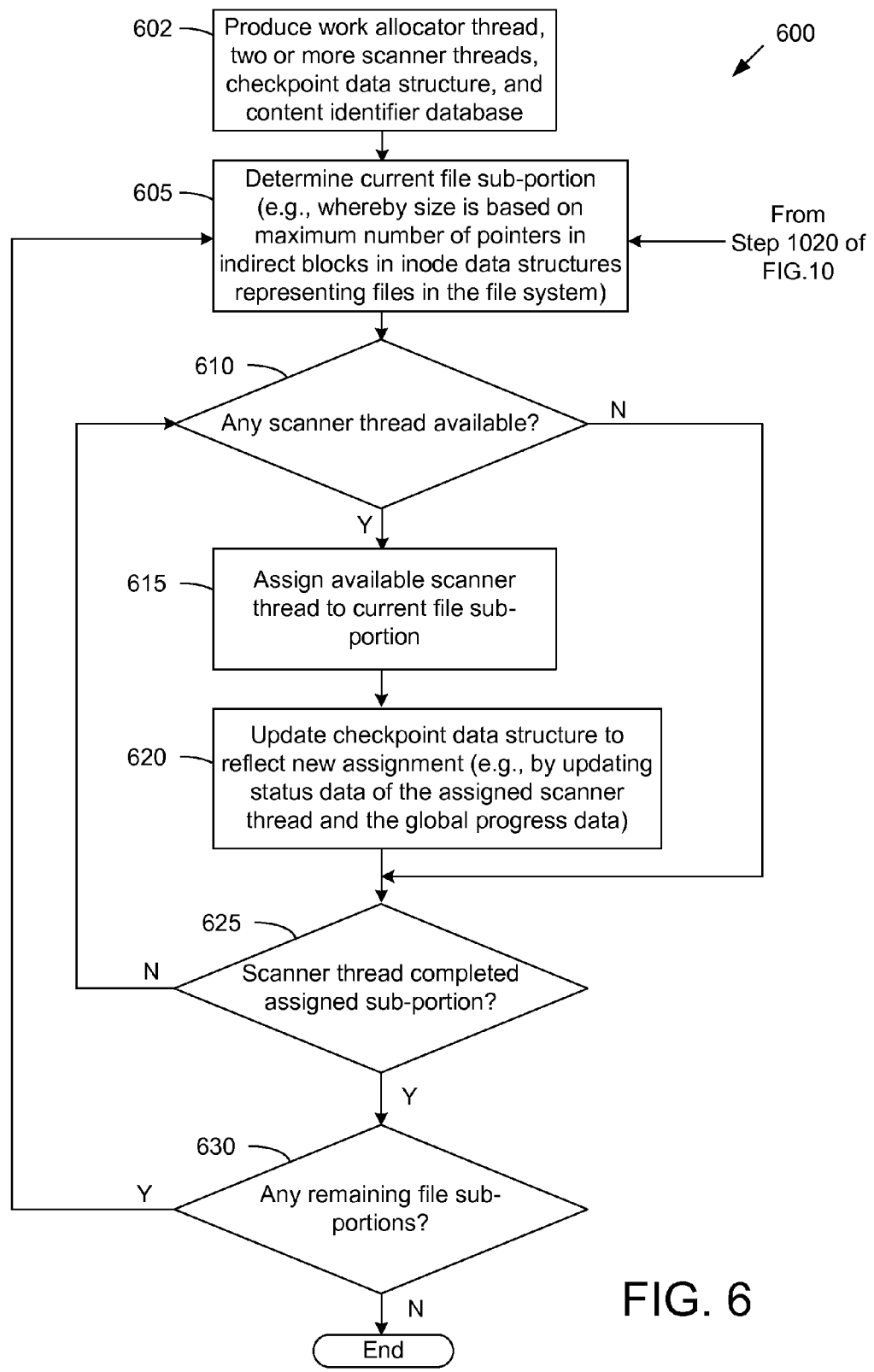
FIG. 6 is a flowchart of a method for processing data of a file using multiple threads during a deduplication gathering phase.

FIG. 6 is a flowchart of a method for processing data of a file using multiple threads during a deduplication gathering phase. In some embodiments, some of the steps of the method 600 may be performed by the storage operating system 300, deduplication layer 275, the work allocator thread 280, and/or scanner threads 285. The order and number of steps of the method 600 are for illustrative purposes only and, in other embodiments, a different order and/or number of steps are used. The method 600 of FIG. 6 is described in relation to FIGS. 2, 7, and 8 which conceptually illustrate steps of the method 600.

The method 600 produces (at 602) a work allocator thread 280, two or more scanner threads 285, a checkpoint data structure 290, and a content identifier database 295 (as shown in FIG. 2). In some embodiments, the storage operating system 300 may produce the work allocator thread 280 and the two or more scanner threads 285. In some embodiments, the storage operating system 300 may produce a predetermined number of scanner threads (e.g., 5 scanner threads). In other embodiments, the storage operating system may also dynamically allocate and produce new scanner threads as the state of the storage system changes (e.g., upon a reduction of the work load and/or an increase of available resources of the storage system).

The work allocator thread 280 may be configured to sub-divide files into sub-portions, allocate/assign work (file sub-portions) to the scanners threads 285, and update the checkpoint data structure 290 to reflect current work assignments for each scanner thread (i.e., "status data" for each scanner thread) and to reflect the last work assigned to any of the scanner threads (i.e., "global progress data" for all the scanner threads). Each scanner thread 285 may be configured to receive assigned file sub-portions from the work allocator thread 280, process each data block of the assigned file sub-portion by producing and storing a content identifier for each data block in the content identifier database 295, and inform the work allocator thread 280 when it has completed its currently assigned file sub-portion. Each scanner thread 285 may have a scanner identifier that unique identifies the scanner thread relative to the other scanner threads.

The checkpoint data structure 290 may be configured to store two types of information: 1) status data for each scanner thread that specifies the current file sub-portion assigned to each scanner thread, and 2) global progress data that indicates the last file sub-portion assigned to any of the scanner threads. FIG. 7 shows a conceptual diagram of an exemplary checkpoint data structure 290 having a plurality of entries 701. An entry 701 may comprise an entry type field 705, an inode number field 710, and an FBN field 715. An entry type may comprise a global progress entry or a scanner status entry. For a global progress entry 701, the inode number field 710 and FBN field 715 indicate the last file sub-portion assigned to any of the scanner threads. For example, the global progress entry 701 may specify inode number Z and FBN K which indicate that last file sub-portion assigned to any of the scanner threads is in file Z (corresponding to inode number Z), the last FBN of the file sub-portion being FBN Z. A global progress entry 701 may also have a scanner field 720 indicating the total number of available scanner threads (e.g., 6).

Each scanner status entry 701 may contain status data for a particular scanner thread. For a scanner status entry 701, the entry type field 705 may specify a scanner thread identifier of the particular scanner thread and the inode number field 710 and FBN field 715 may indicate the file sub-portion currently allocated/assigned to the particular scanner thread. For a scanner status entry 701, the FBN field 715 may specify a range of FBNs of the currently allocated/assigned file sub-portion (e.g., the first and last FBNs of the currently assigned file sub-portion). For example, the scanner status entry 701 may specify scanner 1, inode number X and FBN B to FBN C which indicate that scanner 1 is currently assigned to a file sub-portion in file X (corresponding to inode number X), the file sub-portion comprising the range of FBNs B to C within file X.

The global progress data in a global progress entry may be used by the work allocator thread 280 to determine the next file sub-portion to assign to a scanner thread and for determining where to resume assigning file sub-portions after a system crash and restart. The status data in a scanner status entry may be used by its corresponding scanner thread 285 to determine which file sub-portion to resume processing after a system crash and restart. Initially, all field values of the entries may be null and the field values updated as file sub-portions are assigned and processed.

The scanner threads process data blocks of the assigned file sub-portion to produce and store content identifiers to the content identifier database 295 (shown in FIG. 2) during a "gathering" phase. A content identifier database 295 may then be used to identify redundant blocks (using the produced content identifiers) and deduplicate data blocks as necessary. The checkpoint data structure 290 and content identifier database 295 may be resident in memory 240. In other embodiments, the checkpoint data structure 290 and content identifier database 295 may also be resident in NVRAM 245 or stored on a storage device 125 (e.g., stored on an aggregate or volume in a metadata section not accessible to users).

The method 600 then determines (at 605), for processing, a current file sub-portion of a current file in the file system. The method may do so by sub-dividing the current file into multiple file sub-portions and determining a current file sub-portion to process, each file sub-portion having a predetermined number of data blocks (data block size). In some embodiments, the data block size of a file sub-portion is predetermined based on the organization of inode data structures representing the files (described in Section III). For example, the data block size of the file sub-portion may be predetermined based on the maximum number of pointers allowed in an indirect block in the inode data structures. For the first iteration, the method may determine a first sub-portion in a first file of the file system as the current file sub-portion. In later iterations, the method may determine the current file sub-portion using the global progress entry in the checkpoint data structure 290, e.g., by determining the next file sub-portion after the last allocated file sub-portion (specified by the inode number and FBN in the global progress entry).

Figure 8:
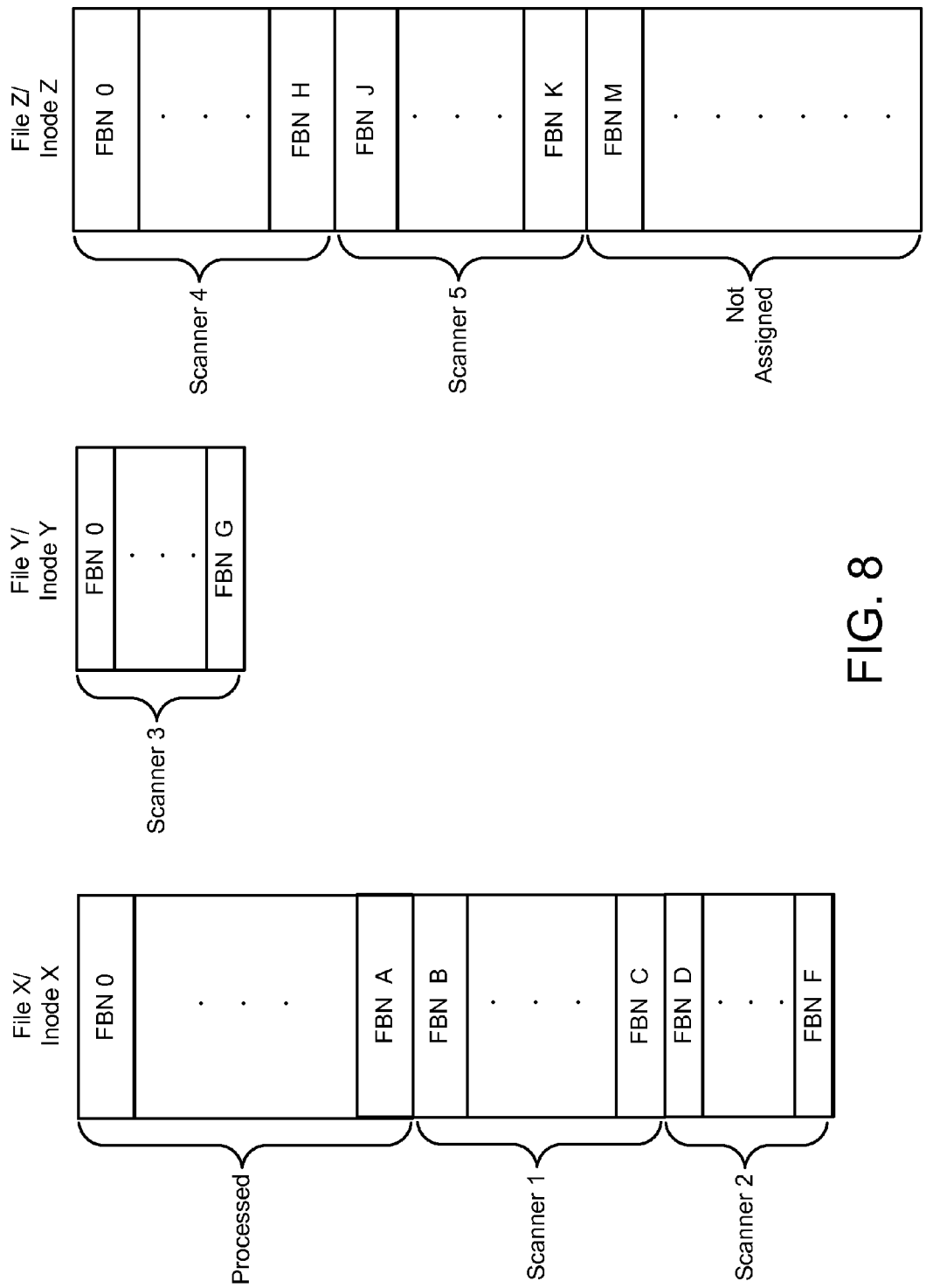
FIG. 8 shows an exemplary conceptual diagram of various files comprising file sub-portions that are processed by scanner threads.

FIG. 8 shows an exemplary conceptual diagram of various files comprising file sub-portions that are processed by scanner threads. In the example of FIG. 8, three files X, Y, and Z ("Inode X," "Inode Y," and "Inode Z," respectively) each comprise a plurality of data blocks having associated FBNs. Each file sub-portion comprises a range of data blocks of a file (specified by the first and last FBNs). In FIG. 8, the file sub-portion spanning from FBN B to FBN C in file X (Inode X), the file sub-portion spanning from FBN 0 to FBN H in file Z (Inode Z), and the file sub-portion spanning from FBN J to FBN K in file Z (Inode Z) are examples where the current file sub-portion determined by the method (at 605) has the predetermined data block size.

In some embodiments, the method determines (at 605) the current file sub-portion such that the file sub-portion does not span across two different files. In these embodiments, if the data block size of the current file is less than the predetermined data block size of a file sub-portion, the method determines (at 605) that the current file sub-portion comprises only the data blocks of the current file (rather than comprising data blocks of the current file and data blocks of a next file). Note that in this situation, the data block size of the current file sub-portion may be less than the predetermined data block size. In FIG. 8, the file sub-portion spanning from FBN 0 to FBN G in file Y (Inode Y) is an example where the current file sub-portion comprises the current file (file Y) which is less than the predetermined data block size.

Further, if the remaining unprocessed portion of a current file is less than the predetermined data block size, the method (at 605) determines that the current file sub-portion comprises only the remaining unprocessed portion (rather than comprising the remaining portion of the current file and a portion of a next file). Note that in this situation, the data block size of the current file sub-portion will also be less than the predetermined data block size. In FIG. 8, the file sub-portion spanning from FBN D to FBN F in file X (Inode X) is an example where the current file sub-portion comprises the remaining portion of the current file (file X) which is less than the predetermined data block size.

The method 600 then determines (at 610) whether there are any scanner threads 285 available that are not currently processing a file sub-portion. If not, the method proceeds at step 625. If so, the method 600 then assigns (at 615) an available scanner thread 285 (having a scanner thread identifier) to the current file sub-portion. The method 600 then updates (at 620) the checkpoint data structure 290 to reflect the new assignment by updating the status data of the assigned scanner thread and the global progress data. The method may do so by updating the scanner status entry 701 corresponding to the assigned scanner thread (determined using the scanner thread identifier) to specify the inode number and the first and last FBNs of the currently assigned file sub-portion. The method may also update the global progress entry to specify the inode number and the last FBN of the currently assigned file sub-portion. In alternative embodiments, the method may update (at 620) the checkpoint data structure 290 only when certain conditions are met (e.g., when a certain amount of content identifiers have been produced and stored and/or a predetermined time interval has passed since the last checkpoint data structure update).

The method 600 then determines (at 625) whether any scanner thread has completed processing its currently assigned file sub-portion (e.g., by determining whether a scanner thread 285 has informed the work allocator thread 280 that it has completed its currently assigned file sub-portion). If not, the method proceeds at step 610. If so, the method then determines (at 630) whether there are any remaining file sub-portions in the file system for processing. If so, the method continues at step 605 where it determines a next current file sub-portion for processing. The method may do so using the global progress data in the global progress entry by determining the next file sub-portion that is after the last allocated file sub-portion specified by the inode number and FBN in the global progress entry. If the method determines (at 630-No) that there are no remaining file sub-portions in the file system for processing, the method 600 ends.

As described, the method 600 of FIG. 6 processes each file in the file system by sub-dividing the files into file sub-portions, assigning a scanner thread for processing each sub-portion as they are available, and updating the global progress data and status data of each sub-portion in the checkpoint data structure 290. FIG. 8 shows an example where data blocks FBN 0 to FBN A of file X have already been processed, scanner thread 1 has been assigned to the sub-portion from FBN B to FBN C of file X, and scanner thread 2 has been assigned to the sub-portion from FBN D to FBN F of file X. Also, scanner thread 3 has been assigned to the sub-portion comprising the entire file Y from FBN 0 to FBN G. Further, scanner thread 4 has been assigned to the sub-portion from FBN 0 to FBN H of file Z, scanner thread 5 has been assigned to the sub-portion from FBN J to FBN K of file Z, and the remaining data blocks of file Z has not been assigned to a scanner thread yet. As shown in the example of FIG. 7, the global progress entry and the scanner status entries of the checkpoint data structure 290 has been updated according to the illustrative examples shown in FIG. 8.

D. Method for Processing a File Sub-Portion

FIG. 9 is a flowchart of a method for processing a file sub-portion during a deduplication gathering phase. In some embodiments, some of the steps of the method 900 may be performed by each scanner thread 285. The order and number of steps of the method 900 are for illustrative purposes only and, in other embodiments, a different order and/or number of steps are used.

The method 900 receives (at 905), from the work allocator thread 280, an assigned file sub-portion for processing (the assigned sub-portion comprising data blocks of a file). For example, the method may receive an inode number and first and last FBNs of data blocks of the file sub-portion. The method 900 then retrieves (at 910) the data stored in the data blocks of the assigned file sub-portion. The method may do so by accessing the inode data structure (identified using by the received inode number) corresponding to the file sub-portion. The inode data structure may comprise pointers that lead to the data blocks, discussed below in Section III.

The method 900 then produces (at 915) a content identifier for each retrieved data block in the assigned file sub-portion and stores the content identifiers to the content identifier database 295. The method 900 then informs (at 920) the work allocator thread 280 that it has completed its currently assigned file sub-portion. The method then ends.

E. Method for Restarting Gathering Phase

FIG. 10 is a flowchart of a method for restarting the gathering phase after a system crash and restart. In some embodiments, some of the steps of the method 1000 may be performed by the storage operating system 300, deduplication layer 275, the work allocator thread 280, and/or scanner threads 285. The order and number of steps of the method 600 are for illustrative purposes only and, in other embodiments, a different order and/or number of steps are used.

The method 1000 restarts (at 1005) the storage system after a storage operating system 300 crash. Each scanner thread 285 then reads (at 1010) its corresponding scanner status entry from the checkpoint data structure 290 to determine its currently assigned file sub-portion (i.e., the file sub-portion it was processing just before the crash). Each scanner thread 285 then re-starts processing (at 1015) of data blocks from the beginning of the currently assigned file sub-portion. Note that the scanner thread 285 may need to re-process some data blocks in the currently assigned file sub-portion that it already processed before the crash. However, the amount of re-processing work required by each scanner thread 285 may be limited to a maximum of the predetermined data block size of a file sub-portion if the status data of each scanner thread is updated in the checkpoint data structure 290 each time the scanner thread completes its assigned file sub-portion and is assigned a new file sub-portion.

Each scanner thread 285 then re-starts processing (at 1015) of data blocks from the beginning of the currently assigned file sub-portion. Note that the scanner thread 285 may need to re-process some data blocks in the currently assigned file sub-portion that it already processed before the crash. For example, if the scanner thread processed 30% of the data blocks of the currently assigned sub-portion prior to the crash, upon restart, the scanner thread re-starts processing from the beginning of the currently assigned sub-portion and re-processes the 30% of the data blocks previously processed. However, the maximum number of data blocks needed to be re-processed by each scanner thread 285 may be limited and equal to the predetermined data block size of a file sub-portion (since the status data of each scanner thread is updated in the checkpoint data structure 290 each time the scanner thread completes its assigned file sub-portion and is assigned a new file sub-portion).

The work allocator thread 280 then reads (at 1020) the global progress entry from the checkpoint data structure 290 to determine the last data block of the last file sub-portion assigned to a scanner thread. The work allocator thread 280 may use the last data block of the last assigned file sub-portion to determine the next file sub-portion to assign to a next available scanner thread. Then method then proceeds to step 605 of method 600.

III. Inode Data Structures

In some embodiments, the data block size of a file sub-portion is predetermined based on the organization of mode data structures representing the files. As known in the art, a file system implemented on the storage system may use mode data structures (buffer trees) to represent the files in the file system.

Figure 11:
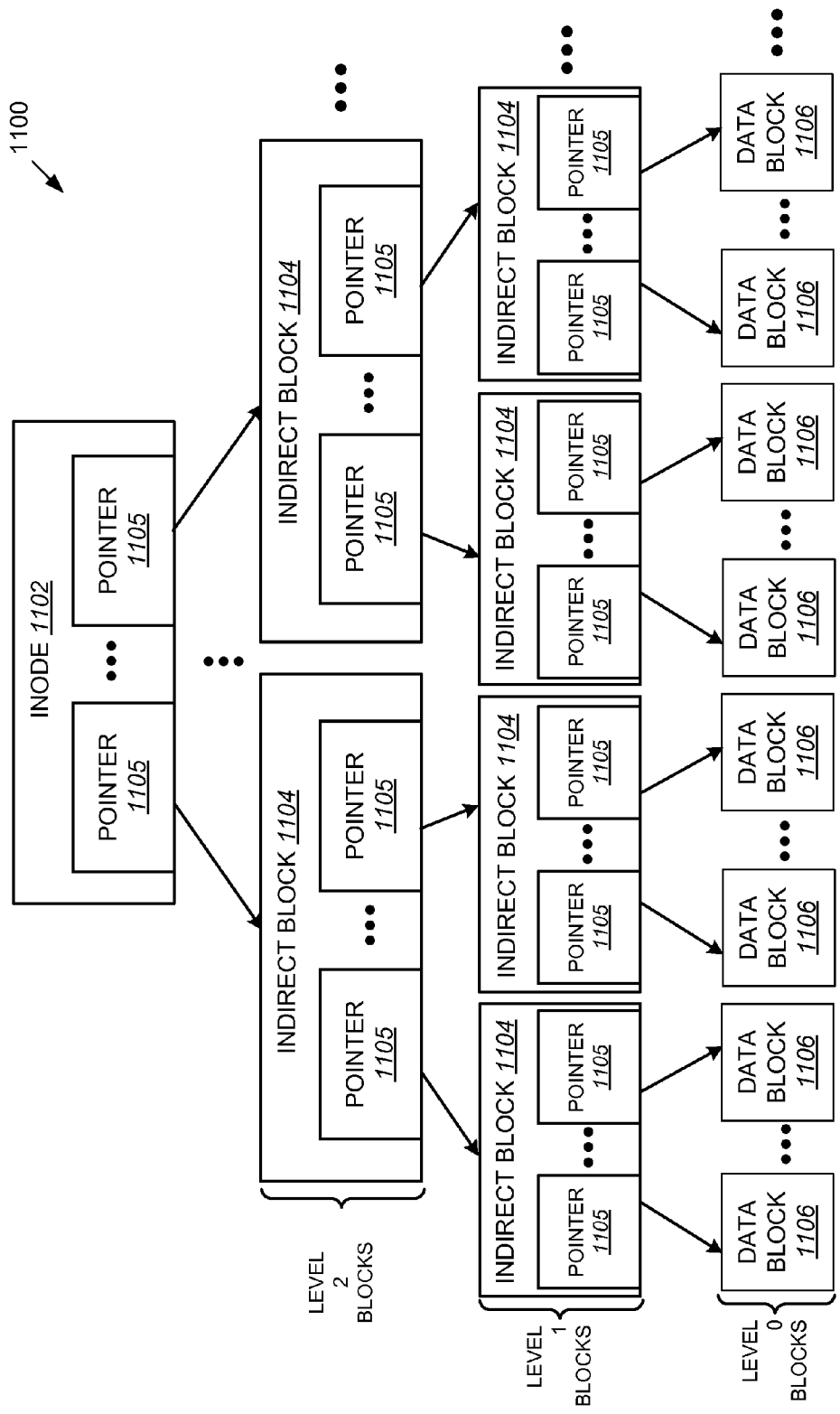
FIG. 11 is a conceptual diagram of an exemplary inode data structure representing a file.

FIG. 11 is a conceptual diagram of an exemplary mode data structure (buffer tree) representing a file. The mode data structure 1100 may comprise an internal representation of data blocks for a file loaded into the memory and maintained by the file system. An mode data structure for a file may comprise a root level mode 1102, zero or more indirect blocks 1104, and one or more data blocks 1106. The root level mode 1102 may store metadata information about the file (such as name of the file, when the file was produced or last modified, ownership of the file, access permission for the file, size of the file, etc.). An mode 1102 may also contain pointers 1105 that ultimately lead to the storage locations of the data blocks 1106 of the file. For relatively small files, the pointers 1105 in the inode may lead directly to the data blocks 1106. For larger files, however, one or more levels of indirection may be needed and the pointers 1105 may lead to indirect blocks 1104 that also store pointers 1105 ultimately leading to the data blocks of the file.

An indirect block 1104 stores pointers 1105 to data blocks or other indirect blocks. The inode data structure 1100 may implement zero or more levels of indirect blocks 1104. As used herein, one level of indirection comprises one level of indirect blocks, each indirect block in the level being referenced (pointed to) by a pointer in an inode or indirect block and also containing pointers that reference (point to) data blocks or other indirect blocks. In the example of FIG. 11, the inode data structure 1100 comprises two levels of indirect blocks 1104 (levels 1 and 2). In other embodiments, the inode data structure 1100 may comprise a different number of indirection levels depending upon the size of the file.

Each level 2 indirect block 1104 may contain pointers to level 1 indirect blocks. Each level 1 indirect block 1104 may contain pointers to data blocks (level 0 blocks) that contain the actual data of the file. The pointers to the data blocks may comprise address locations indicating where the data blocks are stored on a storage device. For example, the address location may comprise a unique logical block number (LBN) given by the file system for each data block of the file for locating the data block. Note that an storage address location (e.g., LBN) of a data block may be used to locate and retrieve data from the data block, whereas the FBN of a data block refers to the sequence ordering of data within a file (and does not necessarily indicate the storage location of the data block).

Typically, the file system will arrange/organize the inode data structure 1100 for each file in a predetermined manner (depending on the type of file system). For example, the file system may arrange the inode data structures by allowing each indirect block 1104 to contain a maximum of 510 pointers to data blocks 1106 or other indirect blocks 1104. As discussed above, a file sub-portion comprises a predetermined number of data blocks 1106 of a file. In these embodiments, the number of data blocks (data block size) of a file sub-portion may be predetermined based on the organization of the inode data structures representing the files.

In some embodiments, the data block size of a file sub-portion is based on the maximum number of pointers to data blocks or indirect blocks that an indirect block in the inode data structure may contain. For example, if each indirect block 1104 may contain a maximum of 510 pointers to data or indirect blocks, the data block size of a file sub-portion may be based on the number 510. In some embodiments, the predetermined data block size is equal to an integer power of the maximum number of pointers an indirect block may contain in the inode data structure. This may be represented by the equation: File sub-portion data block size=(maximum number of pointers)^N, where N is an integer. For example, the block size of a file sub-portion may be set to equal 510 data blocks (which allows for one level of indirection), or set to equal 510*510 data blocks (which allows for two levels of indirection), etc.

By basing the file sub-portion size on the maximum number of pointers in an indirect block, the size of the file sub-portion may be aligned with the organization of the inode data structures to allow faster performance in processing the file sub-portions by the scanner threads. This is because, as described above, data blocks 1106 are used to store the actual data of the file and the locations (pointers) of these data blocks may be stored in the indirect blocks 1104 of the file. As such, after a scanner thread 285 receives an assigned sub-portion to process (the assigned sub-portion comprising data blocks of a file), the scanner thread needs to retrieve the data stored in the data blocks by accessing the inode data structure of the file and reading/examining the pointers in the inode and indirect blocks for locating the data blocks. If the data block size is predetermined based on the maximum number of pointers in an indirect block, the scanner thread may need to retrieve and examine pointers from a fewer number of indirect blocks on the same level of indirection. This will provide faster location and retrieval of data blocks in the inode data structure, thus providing faster performance of the scanner threads in processing the data blocks.

For example, if the data block size is fixed at 510 and the inode data structure 1100 for a file comprises one level of indirect blocks (level 1 blocks), the scanner thread would be assigned a sub-portion comprising 510 data blocks and would need to retrieve and examine 510 pointers from a single level 1 indirect block to locate the 510 data blocks. In contrast, if the data block size is fixed at 810, the scanner thread would be assigned a sub-portion comprising 810 data blocks and would need to retrieve and examine pointers from two level 1 indirect blocks to locate the data blocks, thus reducing the performance speed of the scanner thread.

To further illustrate, assume a file to be scanned comprises 1020 data blocks (having FBNs 1-1020). The inode data structure 1100 for the file may comprise two level 1 blocks (indirect block1 and indirect block2), where indirect block1 contains pointers for FBN (1-510) and indirect block2 contains pointers for FBN (510-1020). If the data block size is fixed at 510, each of two scanner threads would retrieve 510 pointers from a single indirect block (e.g., scanner thread1 would retrieve 510 pointers from indirect block1 and scanner thread2 would retrieve 510 pointers from indirect block2). If the data block size is fixed at 810, each of two scanner threads would retrieve 510 pointers from a single indirect block (e.g., scanner thread1 would retrieve 510 pointers from indirect block1 and scanner thread2 would retrieve 510 pointers from indirect block2). In contrast, if the data block size is fixed at 810, scanner thread1 would need to retrieve pointers from two indirect blocks (indirect block1 and indirect block2) to read FBN 1-810, and scanner thread2 would need to retrieve pointers from indirect block2 to read FBN 811-1020.

As another example, if the data block size is fixed at 510*510 and the inode data structure 1100 for a file comprises two levels of indirect blocks (levels 1 and 2), the scanner thread would be assigned a sub-portion comprising 510*510 data blocks and would need to retrieve and examine 510*510 pointers from a single level 2 indirect block to locate the level 1 indirect blocks. In contrast, if the data block size is fixed at 810*810, the scanner thread would be assigned a sub-portion comprising 810*810 data blocks and would need to retrieve and examine pointers from two level 2 indirect blocks, thus reducing the performance speed of the scanner thread.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for processing data blocks of a file for deduplication, the storage system comprising:
   computer hardware configured for:
      determining a plurality of sub-portions of the file, each sub-portion comprising a predetermined number of data blocks of the file;
      assigning a scanner thread to each of the plurality of sub-portions; and
      storing status data of each scanner thread in a checkpoint data structure, the status data of a scanner thread indicating the sub-portion currently assigned to the scanner thread; and
   the plurality of scanner threads, each scanner thread configured for:
      processing the data blocks of the assigned sub-portion to produce and store content identifiers for the data blocks to a content identifier database;
      upon a crash and restart of the storage system, reading its corresponding status data in the checkpoint data structure to determine its currently assigned sub-portion; and
      re-starting processing of data blocks from the currently assigned sub-portion, wherein a maximum number of data blocks for re-processing by the scanner thread is equal to the predetermined number of data blocks of a sub-portion.

2. The storage system of claim 1, wherein a sub-portion is specified by a file identifier and first and last file block numbers that specify a range of data blocks in the file.

3. The storage system of claim 1, wherein the computer hardware is further configured for:
   determining that a scanner thread has completed processing its currently assigned sub-portions;
   assigning the scanner thread to a new sub-portion; and
   updating the status data of the scanner thread in the checkpoint data structure to indicate that the new sub-portion is currently assigned to the scanner thread.

4. The storage system of claim 1, wherein the plurality of scanner threads simultaneously process data blocks of the file.

5. The storage system of claim 1, wherein the content identifiers of data blocks stored in the content identifier database are used to determine and deduplicate redundant data blocks.

6. The storage system of claim 1, wherein:
   the storage system implements a file system that represents the file as an inode data structure; and the predetermined number of data blocks of a sub-portion is determined based on the arrangement of the inode data structure.

7. The storage system of claim 6, wherein
the inode data structure comprises one or more indirect blocks comprising a maximum number of pointers to data blocks or indirect blocks; and
the predetermined number of data blocks of a sub-portion is determined based on the maximum number of pointers allowed in an indirect block of the inode data structure.

8. The storage system of claim 6, wherein
the inode data structure comprises one or more indirect blocks comprising a maximum number of pointers to data blocks or indirect blocks; and
the predetermined number of data blocks of a sub-portion is equal to an integer power of the maximum number of pointers allowed in an indirect block of the inode data structure.

9. A method for processing data blocks of a file for deduplication in a storage system, the method comprising:
determining, using a deduplication engine, a plurality of sub-portions of the file, each sub-portion comprising a predetermined number of data blocks of the file;
assigning, using a deduplication engine, a scanner thread to each of the plurality of sub-portions;
storing, using a deduplication engine, status data of each scanner thread in a checkpoint data structure, the status data of a scanner thread indicating the sub-portion currently assigned to the scanner thread;
processing, using a scanner thread, the data blocks of the assigned sub-portion to produce and store content identifiers for the data blocks to a content identifier database;
upon a crash and restart of the storage system, reading, using the scanner thread, its corresponding status data in the checkpoint data structure to determine its currently assigned sub-portion; and
using the scanner thread, re-starting processing of data blocks from the currently assigned sub-portion, wherein a maximum number of data blocks for re-processing by the scanner thread is equal to the predetermined number of data blocks of a sub-portion.

10. The method of claim 9, wherein a sub-portion is specified by a file identifier and first and last file block numbers that specify a range of data blocks in the file.

11. The method of claim 9, further comprising:
determining that a scanner thread has completed processing its currently assigned sub-portions;
assigning the scanner thread to a new sub-portion; and
updating the status data of the scanner thread in the checkpoint data structure to indicate that the new sub-portion is currently assigned to the scanner thread.

12. The method of claim 9, wherein the plurality of scanner threads simultaneously process data blocks of the file.

13. The method of claim 9, wherein the content identifiers of data blocks stored in the content identifier database are used to determine and deduplicate redundant data blocks.

14. The method of claim 9, wherein:
the storage system implements a file system that represents the file as an inode data structure; and
the predetermined number of data blocks of a sub-portion is determined based on the arrangement of the inode data structure.

15. The method of claim 14, wherein
the inode data structure comprises one or more indirect blocks comprising a maximum number of pointers to data blocks or indirect blocks; and
the predetermined number of data blocks of a sub-portion is determined based on the maximum number of pointers allowed in an indirect block of the inode data structure.

16. The method of claim 14, wherein
the inode data structure comprises one or more indirect blocks comprising a maximum number of pointers to data blocks or indirect blocks; and
the predetermined number of data blocks of a sub-portion is equal to an integer power of the maximum number of pointers allowed in an indirect block of the inode data structure.

17. A storage system for processing data blocks of a file for deduplication, the storage system comprising:
computer hardware configured for:
determining a plurality of sub-portions of the file, each sub-portion comprising a predetermined number of data blocks of the file; and
assigning a scanner thread to each of the plurality of sub-portions;
the plurality of scanner threads, each scanner thread configured for:
processing the data blocks of the assigned sub-portion to produce and store content identifiers for the data blocks to a content identifier database; and
a file system configured for representing the file as an inode data structure, wherein:
the inode data structure comprises one or more indirect blocks comprising a maximum number of pointers to data blocks or indirect blocks; and
the predetermined number of data blocks of a sub-portion is determined based on the maximum number of pointers allowed in an indirect block of the inode data structure, wherein the predetermined number of data blocks of a sub-portion is equal to an integer power of the maximum number of pointers allowed in an indirect block of the inode data structure.

18. The storage system of claim 17, wherein the content identifiers of data blocks stored in the content identifier database are used to determine and deduplicate redundant data blocks.

19. A method for processing data blocks of a file for deduplication in a storage system, the method comprising:
determining, using a deduplication engine, a plurality of sub-portions of the file, each sub-portion comprising a predetermined number of data blocks of the file;
assigning, using a deduplication engine, a scanner thread to each of the plurality of sub-portions;
processing, using a scanner thread, the data blocks of the assigned sub-portion to produce and store content identifiers for the data blocks to a content identifier database;
representing, using a file system, the file as an inode data structure, wherein:
the inode data structure comprises one or more indirect blocks comprising a maximum number of pointers to data blocks or indirect blocks; and
the predetermined number of data blocks of a sub-portion is determined based on the maximum number of pointers allowed in an indirect block of the inode data structure, wherein the predetermined number of data blocks of a sub-portion is equal to an integer power of the maximum number of pointers allowed in an indirect block of the inode data structure.

20. The method of claim 19, wherein the content identifiers of data blocks stored in the content identifier database are used to determine and deduplicate redundant data blocks.

* * * * *